_United States Patent Office_ 3,015,468
Patented Jan. 2, 1962

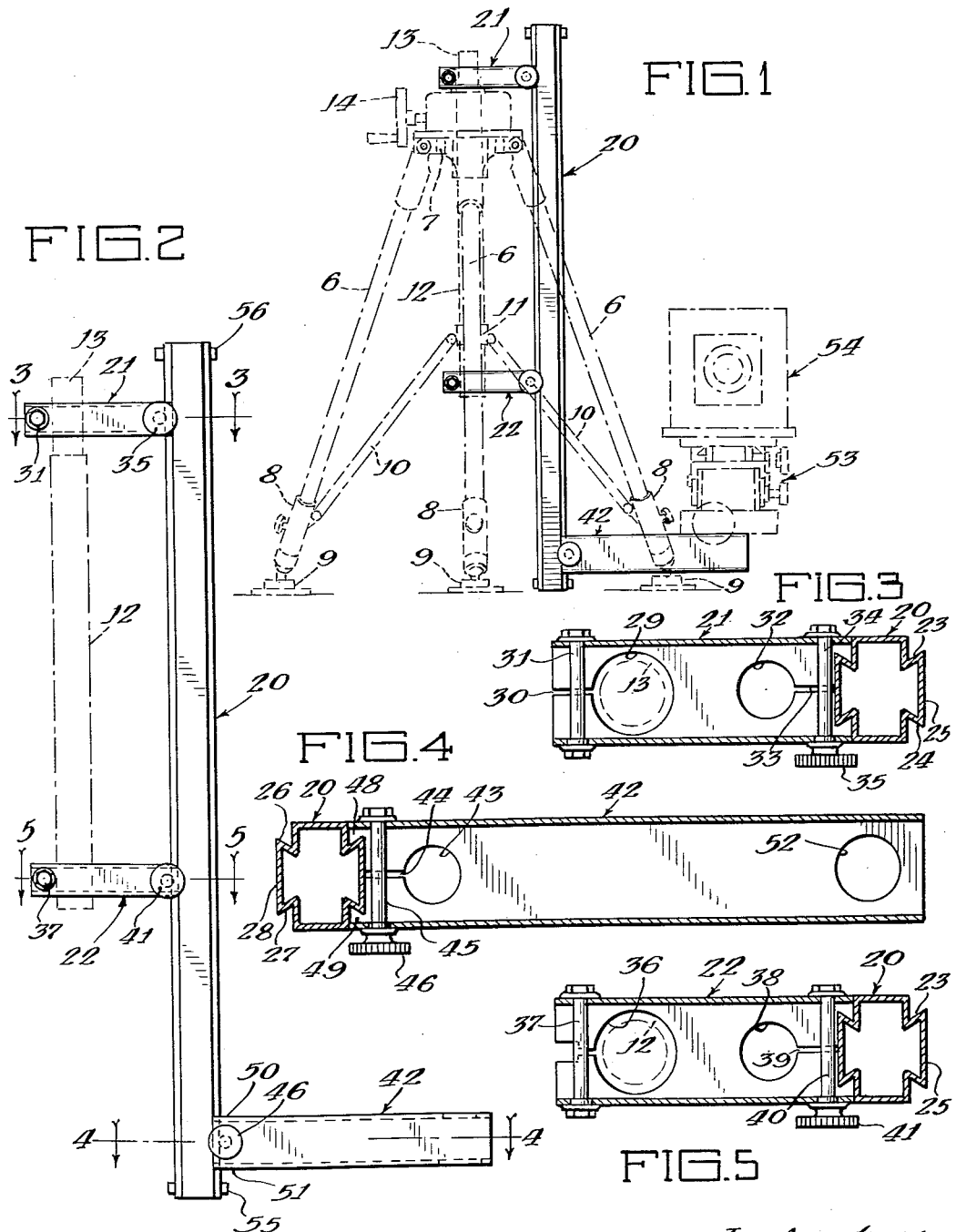

3,015,468
CAMERA SUPPORTING ATTACHMENT
FOR A TRIPOD
Paul C. Mooney, Northbrook, Ill., assignor to
Quick-Set, Inc., a corporation of Illinois
Filed Feb. 23, 1960, Ser. No. 10,221
5 Claims. (Cl. 248—230)

This invention relates to a camera supporting attachment for a tripod.

Tripods are generally used to support still and movie cameras for the taking of photographic pictures. Ordinarily, the camera is placed on top of the tripod on a plate or head adapted to hold the camera steady relative to the tripod. Legs on the tripod may be of a telescoping type so that the height of the camera from the ground or floor may be adjusted. Also, some tripods are provided with a central column which may be adjusted in height relative to the legs of the tripod. In generally all tripod structures the cameras can be adjusted in height from a minimum of a few feet above the ground to a maximum height thereabove.

One of the primary objects of this invention is to provide an attachment for a tripod permitting steady support of a camera throughout a greater range extending from close to the ground or floor to a height above that normally attainable with the tripod itself.

Another primary object of the invention is to provide for a single camera mount usable throughout the range of movement from generally floor level upwardly without requiring any demounting or moving of the camera from its mount.

Another object is to provide an attachment for a camera supporting tripod wherein the position of the camera involves a combination of relatively coarse adjustments throughout the range of camera movement and a fine accurate adjustment of the camera positioned at any height within the total range of movement.

A further object of the invention is to provide an attachment for a camera supporting tripod capable of supporting a camera against vibration or movement throughout the entire range of camera movement specified.

Other objects, features and advantages of the present invention will be understood from the following description of a preferred embodiment illustrated in the accompanying drawings, in which:

FIGURE 1 is a side elevational view of the attachment of this invention shown in position and secured to a tripod illustrated in broken lines and showing a camera and pan head on the attachment also in broken outline;

FIGURE 2 is an enlarged side elevational view of the members of the attachment related to the central column of the tripod shown in FIGURE 1, the column being diagrammatically shown in broken outline;

FIGURE 3 is a horizontal sectional view through the support arm of the attachment structure taken substantially along line 3—3 in FIGURE 2;

FIGURE 4 is a horizontal sectional view through the camera supporting arm of the attachment taken substantially along line 4—4 in FIGURE 2, and FIGURE 5 is a horizontal sectional view through the strut of the attachment structure taken substantially along line 5—5 in FIGURE 2.

The present invention is illustrated in FIGURE 1 of the drawings as related to a tripod intended for professional use, sometimes referred to as an industrial tripod. The tripod itself has three tubular legs 6 joined at their upper ends to a tripod top plate 7 by bolts which permit the legs to swing for collapsing purposes. The legs have a joint 8 at their lower ends and the legs house a telescoping tubular part to which foot plates 9 are attached by ball and socket joints. A swingable strut 10 joins the leg joints 8 and a yoke 11 about the outer stationary part of the central structure of the tripod generally called a strut tube 12. The yoke 11 may slide vertically on the strut tube 12 to accommodate the swinging of the legs 6.

Ordinarily, a camera would be mounted on the top of the central structure of the tripod, and for this purpose, the present tripod is made with an upper telescoping column member 13 which can be adjusted in height relative to the strut tube and remainder of the tripod and thus the floor or ground upon which the tripod sits. For this adjusting purpose a handwheel 14 is connected to a pinion engaging a rack on the side of the elevating column member 13, the pinion and rack being of standard construction usually employed in tripods of this type. The tripod as shown in FIGURE 1 is in its approximate lowermost position so that a camera placed on the top of the tripod would be about 30 inches above the floor upon which the tripod sits. The extension of the legs of the tripod and the extensions of the column 13 to its uppermost height might, for some such practice, provide a camera height above the floor of generally 6 to 7 feet.

The attachment of the present invention is intended to be used with the tripod in such a manner that the camera may be mounted upon a pan head and remain on the pan head while the same is being moved throughout the range of movement from just above floor level to above the total height possible within the particular tripod. The parts of the attachment itself are best illustrated in FIGURES 2 through 5. A structural tube or post member 20 is held in an upright relation relative to the tripod by a post support 21 and a strut or brace member 22 each of which is attached to the central structure of the tripod. In the preferred embodiment the tube or post member is preferably formed of aluminum alloy, which is noted for its strength and light weight, and is made so that a dovetailed way is provided on each side. Referring to FIGURE 3, the post member is shown in section as having a dovetailed way shaped like the mortise of a dovetailed joint involving sloped sides 23 and 24 adjacent the outer surface 25 between the surfaces. Referring to FIGURE 4, the opposite side of the post member 20 is similarly shaped with a dovetailed way formed by the sloping sides 26 and 27 at either side of the outer surface 28 extending therebetween. The dovetailed shaped ways preferably extend over the entire length of the post member. Additionally, the post member is hollow with walls of sufficient strength to withstand considerable rough handling and pressure from the support arms and camera arms intended to be attached to the post member.

The upper support arm 21 is of general square box section shape and formed of aluminum allow. Referring to FIGURE 3, one end of the box shape is drilled with an enlarged opening 29 and an adjoining cut or slit 30 to the end of the arm so that a bolt 31 between opposite sides of the box member may squeeze those sides toward each other, forming a clamp for attaching the arm rigidly to the elevating column member 13 of the tripod. The bore 29 is of a size to fit snugly about the column portion 13 of the tripod and may be clamped securely thereto. The fact that the arm is a box section provides supporting areas of contact, vertically spaced along the column, maintaining the arm rigidly mounted on the column while preventing the outer end from moving up or down relative to the column.

The outer end of the post member support arm 21 is shaped to fit upon and receive the dovetailed way on one side of the post member. In order to lend some resiliency to the box section and allow it to be clamped upon the way, a bore 32 and adjoining slot 33 to the end of the member gives some resiliency to the end intended to be clamped upon the way. A bolt 34 provided with a thumb screw 35 passes through the member at 90° to the bore 32 in order to provide a clamping force upon the box section. When the upper support arm 21 is clamped to the elevating column of the tripod and to the way on the post member, there is provided a rigid connection between the tripod and the post member tending to hold the post member in its upright position. The support is so rigid that there is no movement between the post member and column of the tripod and the steadiness of the tripod is imparted to the post member.

In order to insure the rigidity of the post member relative to the tripod, a strut 22 may also be employed. The strut illustrated in FIGURE 5 is also clamped to the strut tube 12 of the tripod, the latter passing through an appropriate bore 36 in the box section of the strut and clamped thereon by using bolt 37 mounted in the strut member. The opposite end of the strut is constructed to receive the same dovetailed way on the post member as is received by the upper support arm 21. Here also, resiliency is imparted to the box section by the bore 38 and slot 39 and clamped on the way by use of the bolt 40 and thumb screw 41.

The adjustability of the column of the tripod mentioned above may also be imparted to the entire post member 20. Since the lower strut member 22 is attached rigidly to the non-moving or stationary strut tube 12 of the tripod central structure it is necessary to loosen the grip of the strut on the post member when any adjustment is made. The thumb screw 41 may be used easily and quickly for loosening the grip of the strut on the post member while the movable column part of the tripod is adjusted by the use of a handwheel 14 carrying the post 20 therewith. While the adjustment is being made, the post dovetailed way merely slides within the fingers formed on the end of the strut 22 receiving the way. In some tripods, the column 13 may extend through the strut tube 12, in which event the post member may be secured only to the column 13. In such instances, both the upper support arm 21 and lower strut 22 may be clamped onto the column 13 so that the post member moves with the column.

A camera support arm 42 is formed of a large box section beam member attached to the outer way of the post member. As shown in FIGURE 4, this is accomplished in a manner similar to that used on the support arm and strut. One end of the camera arm is provided with a bore 43 and slot 44 extending to the end of the member and traversed by a bolt 45 upon which a thumb screw 46 is mounted. The bolt extends crosswise of the slots 44 in opposite walls of the box member so as to pull the fingers 48 and 49 on the end of the box section into tight embracing engagement upon the dovetailed mortise on the outer side of the post members. The top surface 50 and bottom surface 51 (FIGURE 2) of the camera support arm are sufficiently spaced apart to provide spaced bearings on the post member preventing the camera arm from any movement relative to the post once it is clamped in place. The box section of the arm is quite rigid and can support considerable weight without appreciable deflection. The outer end of the arm is provided with a bore 52 for receiving the male part on a pan head 53 shown diagrammatically in FIGURE 1. The camera 54 may be mounted on the pan head and positioned as to its direction of focusing by the pan head itself.

Once the camera is attached to the arm 42, it need not be removed from the pan head nor does the pan head need to be moved from the arm. In use, the photographer may make a relatively coarse adjustment of the position of the arm 42 anywhere along the length of the post member 20. Stops 55 and 56 at opposite ends of the post prevent the arm from being accidentally moved off the post while the photographer is watching the image in his camera. Ordinarily, the photographer will move the camera arm and camera to generally the position he desires and then clamp the arm to the post by the use of the thumb screw 46. For finer adjustment, generally he will use the elevating mechanism of the tripod as controlled by the handwheel 14. When he has arrived at the desired position, the strut 22 is clamped to the post and the elevating mechanism of the tripod is clamped or locked, thus making the entire attachment and tripod into one rigid structure, allowing no movement of the camera from the adjusted position. In structures where the post member is carried exclusively by the column 13, clamping the column in the tripod will serve to lock the post member in desired selected position.

The post member may be adjusted in its position relative to the support arm 21 by moving the post in the jaws of the support arm and strut to a position above that shown. In this manner, a complete range of adjustment of camera position from floor level to above that attainable by the tripod alone is achieved. Both coarse and fine adjustments are possible at any position within the total range of movement.

The foregoing detailed description has been given for clearness of understanding only, and no unnecessary limitations are to be understood therefrom, for some modifications will be obvious to those skilled in the art.

I claim:

1. A tripod camera supporting attachment for rigidly positioning a camera at any selected position within a range from floor level to above total tripod height, comprising: an elongated structural post member adapted to be arranged upright relative to the camera tripod, a support arm securable to the camera tripod and extending laterally therefrom, manually actuated clamping means associated with the outer end of the support arm for selected rigid supporting attachment of the arm to the post member, a strut member adapted to be secured to the tripod in spaced relation to the support arm with manually actuated clamping means for attachment to the post member to brace the same against movement, said manually actuated clamping means being adapted to be loosened for manual up and down selected movement of the post member relative to the tripod and clamps; and a camera supporting arm secured to said post member and extending laterally therefrom to mount a camera thereon, and means for clamping said camera supporting arm along the length of said post member at selected positions, said support arm and strut being adapted to hold said post member rigidly relative to the tripod when the lower end extends upwardly from the floor and when the upper end is elevated above the tripod whereby said post member may provide rigid support for a camera throughout a range from floor level upwardly to above the tripod.

2. A tripod camera supporting attachment for rigidly positioning a camera at any selected position within a range from floor level to above total tripod height, comprising: an elongated structural post member adapted to be arranged upright relative to the camera tripod, a support arm securable to the camera tripod and extending laterally therefrom, manually actuated clamping means associated with the outer end of the support arm for selective rigid supporting attachment of the arm to the post member along its length as desired, a strut member adapted to be secured to the tripod in spaced relation to the support arm with manually actuated clamping means for releasable attachment to the post member to brace the same against movement; and a camera supporting arm secured to said post member and extending laterally therefrom to mount a camera thereon, and means for clamping said camera supporting arm along the length of said post member at selected positions, said post member being movable in an upright direction relative to said support arm and strut from a lower position extending upwardly from the floor to an elevated position above the tripod to provide rigid support for a camera throughout a range from floor level upwardly to above the tripod.

3. A camera supporting attachment for a tripod having a central elevating column, comprising: an upright post member having a pair of dovetail ways extending along its length, the post member being arranged upright beside the column of the tripod; a support arm gripping one dovetail way on the post member and adapted to be secured to the elevating column of the tripod to carry the post member in an upright path with adjustment of the height of the elevating column on the tripod; a strut member being adapted to brace the post member to the tripod column in spaced relation to said supporting arm; and a camera supporting arm releasably clamped to the other dovetail way on the post member and extending laterally outwardly therefrom to support a camera, said camera supporting arm being manually movable along said dovetail way to adjust height of the camera and said post member extending from floor height upwardly for supporting the camera rigidly in selected positions from floor level upwardly.

4. A camera supporting attachment as specified in claim 3 wherein the support arm and camera supporting arm are each a hollow elongated box-like structural member with end walls shaped to receive the respective dovetail way on said post and means are provided to clamp the end walls on the dovetail way to rigidly fix the arm to the post member in an outwardly extending relation thereto.

5. A camera supporting attachment for rigidly positioning a camera in relation to a tripod having a central elevating column and within a range from floor level to above total tripod height, comprising: an elongated structural post member adapted to be arranged upright relative to the camera tripod, a support arm adapted to be secured to the central elevating column of the tripod and extending laterally therefrom, manually actuated clamping means associated with the outer end of the support arm for selective rigid supporting attachment of the arm to the post member along its length as desired, a strut member adapted to be secured to the central elevating column of the tripod in spaced relation to the support arm, manually actuated clamping means on the strut member for bracing attachment to the post member; and a camera supporting arm secured to said post member and extending laterally therefrom to mount a camera thereon, and means for clamping said camera supporting arm along the length of said post member at selected positions, said post member being movable in an upright direction relative to said support arm and strut from a lower position extending upwardly from the floor to an elevated position above the tripod to provide rigid support for a camera throughout a range from floor level upwardly to above the tripod.

References Cited in the file of this patent
UNITED STATES PATENTS

| | | |
|---|---|---|
| 2,453,817 | Shalkhauser | Nov. 16, 1948 |
| 2,535,112 | Woody | Dec. 26, 1950 |
| 2,599,269 | Markle | June 3, 1952 |
| 2,755,053 | Sloane | July 17, 1956 |

FOREIGN PATENTS

| | | |
|---|---|---|
| 14,510 | Great Britain | July 16, 1901 |